United States Patent
Peled et al.

(10) Patent No.: US 7,920,298 B2
(45) Date of Patent: Apr. 5, 2011

(54) METHOD AND SYSTEM FOR DISTRIBUTION POLICY ENFORCEMENT ON FAX

(75) Inventors: Ariel Peled, Even-Yehuda (IL); Guy Lupo, Tel Aviv (IL); Lidror Troyansky, Givataim (IL); Arik Baratz, Hadera (IL); Ofir Carny, Kochav-Yair (IL); Oren Tirosh, Nes Ziona (IL)

(73) Assignee: PortAuthority Technologies Inc., San Diego, CA (US)

( * ) Notice: Subject to any disclaimer, the term of this patent is extended or adjusted under 35 U.S.C. 154(b) by 0 days.

(21) Appl. No.: 12/631,980

(22) Filed: Dec. 7, 2009

(65) Prior Publication Data

US 2010/0085593 A1    Apr. 8, 2010

Related U.S. Application Data (62) Division of application No. 10/787,306, filed on Feb. 27, 2004, now Pat. No. 7,643,164.

(60) Provisional application No. 60/450,336, filed on Feb. 28, 2003.

(51) Int. Cl.
  *H04N 1/00* (2006.01)
(52) U.S. Cl. ....... 358/403; 358/1.15; 358/402; 358/400; 379/100.05; 379/100.08; 709/203
(58) Field of Classification Search ............... 358/403, 358/400, 402, 1.15, 434; 379/100.05, 100.08, 379/100.09, 88.13, 189, 196, 220.01, 243; 709/203
See application file for complete search history.

(56) References Cited

U.S. PATENT DOCUMENTS

| | | | |
|---|---|---|---|
| 4,917,896 A | | 4/1990 | Peck et al. |
| 5,537,458 A | | 7/1996 | Suomi et al. |
| 5,867,495 A | | 2/1999 | Elliott et al. |
| 5,872,845 A | | 2/1999 | Feder |
| 6,417,934 B1 | * | 7/2002 | Sadr-Salek ............... 358/442 |
| 6,574,321 B1 | * | 6/2003 | Cox et al. ............... 379/189 |
| 6,611,581 B1 | * | 8/2003 | Nelson et al. ........... 379/100.09 |
| 6,885,641 B1 | | 4/2005 | Chan et al. |
| 7,054,024 B2 | * | 5/2006 | Salgado et al. ........... 358/1.15 |
| 7,079,488 B1 | * | 7/2006 | Kumar et al. ............ 370/236 |
| 7,363,233 B1 | | 4/2008 | Levine |
| 2001/0046259 A1 | * | 11/2001 | Abrishami ............... 375/222 |

(Continued)

FOREIGN PATENT DOCUMENTS

| | | |
|---|---|---|
| WO | WO02/077847 | 10/2002 |
| WO | WO 02/103461 | 12/2002 |

OTHER PUBLICATIONS

Official Action Dated Dec. 3, 2008 From the US Patent and Trademark Office Re.: U.S. Appl. No. 10/787,306.

(Continued)

*Primary Examiner* — Negussie Worku (57) ABSTRACT

According to a first aspect of the present invention, a method for enforcing a distribution policy with respect to information transmitted from a sending fax machine to a recipient fax machine as fax traffic is presented. The method comprising defining an information distribution policy with respect to the fax traffic, then monitoring the fax traffic in accordance with the distribution policy, where the monitoring comprising: (i) de-modulating the fax traffic being monitored into a digital stream; (ii) reconstructing from the digital stream a graphic image representing at least part of the information within the fax traffic; and (iii) analyzing information within the reconstructed image, and then applying the distribution policy with respect to the analyzed fax traffic.

9 Claims, 8 Drawing Sheets

U.S. PATENT DOCUMENTS

| | | |
|---|---|---|
| 2002/0090073 A1 | 7/2002 | Heilmann et al. |
| 2002/0129140 A1* | 9/2002 | Peled et al. .................. 709/224 |
| 2003/0112940 A1 | 6/2003 | Heilmann et al. |
| 2004/0212828 A1 | 10/2004 | Peled et al. |
| 2005/0066165 A1 | 3/2005 | Peled et al. |
| 2005/0068980 A1 | 3/2005 | Mathew et al. |
| 2005/0114462 A1 | 5/2005 | Mathew et al. |
| 2008/0094654 A1 | 4/2008 | Troyansky et al. |

OTHER PUBLICATIONS

Notice of Action Dated Aug. 21, 2009 From the US Patent and Trademark Office Re.: U.S. Appl. No. 10/787,306.

Official Action Dated Aug. 8, 2008 From the US Patent and Trademark Office Re.: U.S. Appl. No. 10/787,306.

* cited by examiner

METHOD AND SYSTEM FOR DISTRIBUTION POLICY ENFORCEMENT ON FAX

RELATED APPLICATIONS

This application is a divisional of U.S. patent application Ser. No. 10/787,306, filed on Feb. 27, 2004 which claims the benefit of U.S. Provisional Patent Application No. 60/450,336, filed on Feb. 28, 2003, the contents of which are hereby incorporated herein by reference in their entirety.

FIELD OF THE INVENTION

The present invention relates generally to the field of securing information. More specifically, the present invention deals with methods for protecting from confidential Information leakage via fax messages.

BACKGROUND OF THE INVENTION

The information and knowledge created and accumulated by organizations and businesses are most valuable assets. As such, managing and keeping the information and the knowledge inside the organization is of paramount importance for almost any organization, government entity or business, and provides a significant leverage of its value.

One source of information leakage is faxes machines and fax servers, which are widely used in businesses and organizations. The usage of faxes causes, in some cases, unintentional information leakage, when faxes are sent to the wrong destination. In other cases, careless usage of fax machines causes sending of confidential information in a manner that does not comply with the organizational policy, and the confidential or otherwise sensitive information can thereafter be exposed to unauthorized recipients or to eavesdroppers, thereby breaching the confidentiality of the organizational information and possibly also exposing it to legal liabilities.

The problem is further complicated due to the fact that some of the organizations uses fax servers, while other uses modem-based (legacy) fax machines or both.

Prior art solutions focus on fax encryption. However, such solutions usually required special hardware both at the sender and the recipient sites, and do not integrate seamlessly with the normal organizational workflow.

There is thus a recognized need for, and it would be highly advantageous to have, a method and system that allow monitoring and controlling of unauthorized dissemination of information via faxes, which will overcome the drawbacks of current methods as described above.

SUMMARY OF THE INVENTION

According to a first aspect of the present invention, a method for enforcing a distribution policy with respect to information transmitted from a sending fax machine to a recipient fax machine as fax traffic is presented. The method comprising defining an information distribution policy with respect to the fax traffic, then monitoring the fax traffic in accordance with the distribution policy, where the monitoring comprising:

(i) de-modulating the fax traffic being monitored into a digital stream;

(ii) reconstructing from the digital stream a graphic image representing at least part of the information within the fax traffic; and (iii) analyzing information within the reconstructed image, and then applying the distribution policy with respect to the analyzed fax traffic.

In a preferred embodiment of the present invention, the method further comprising initially forwarding the fax traffic from a sending fax device to a an intermediate fax modem attached to a digital storage device; applying the monitoring to the fax traffic at the digital storage device, and sending the information as fax in accordance with the distribution policy from the digital storage device to a recipient fax device.

In a preferred embodiment of the present invention applying the distribution policy comprises applying the distribution policy according to the results of the analyzing information within the reconstructed image.

In a preferred embodiment of the present invention analyzing information within the reconstructed image comprising performing optical character recognition over the fax data.

In a preferred embodiment of the present invention, analyzing information within the reconstructed image further comprising identification of the source of the faxed document.

In a preferred embodiment of the present invention, analyzing information within the reconstructed image further comprises identification of key-words or key phrases within the fax message.

In a preferred embodiment of the present invention, applying of the pre-defined policy comprises adding forensic information to the document.

In a preferred embodiment of the present invention, the policy comprises determining at least one of the following:
the set of authorized recipients, and
the required action.

In a preferred embodiment of the present invention, the policy comprises at least one of the following:
Blocking the transmission;
Logging a record of a fax transmission event and its details, and
Reporting about the fax transmission event and its details according to a pre-defined policy.

In a preferred embodiment of the present invention, applying the policy comprises blocking the transmission to unauthorized recipients.

In a preferred embodiment of the present invention, blocking is applied according to the recipient's phone-numbers.

In a preferred embodiment of the present invention, identifying the recipient's phone-numbers comprises transforming the recipient's phone-number to a Domain-Name Server address.

In a preferred embodiment of the present invention, logged record comprises the sender, the recipients and the identity of the faxed document.

In a preferred embodiment of the present invention, monitoring the fax traffic effected by the distribution policy comprises eavesdropping on the fax traffic.

In a preferred embodiment of the present invention, the distribution policy comprises putting a marker on fax messages, the marker allowing automatic identification or classification of the fax and its content.

In a preferred embodiment of the present invention, the distribution policy comprises embedding details of a sender on the sent message.

In a preferred embodiment of the present invention, embedding of the details comprises embedding the details in a substantially imperceptible manner.

In a preferred embodiment of the present invention, the embedding of the details in a substantially imperceptible manner is robust to fax encoding and to attempts to deliberately remove the encoding.

In a preferred embodiment of the present invention, the distribution policy comprises encrypting at least part of the faxed message.

In a preferred embodiment of the present invention, a cryptographic key for decrypting the encrypted message is sent via another channel.

In a preferred embodiment of the present invention, the policy comprises sending the fax directly to a voice mailbox of a recipient.

In a preferred embodiment of the present invention, the sending fax comprises an analog fax machine.

In a preferred embodiment of the present invention, forwarding the fax traffic to the modem comprises:

Simulating a switch and a receiving fax;
Receiving the dialed digits and the sent fax;
Simulating a sending fax, and
Sending the fax to a modem attached to the digital storage device.

In a preferred embodiment of the present invention, the switch is simulated using a central-office card.

In a preferred embodiment of the present invention, forwarding the fax traffic to the modem comprises forwarding using a hot-line mechanism.

In a preferred embodiment of the present invention, the hot-line is provided by a local PBX switch or a remote switch.

In a preferred embodiment of the present invention, the forwarding occurs before dialing occurs, and the modem receives the dialing directly after an off-hook is received.

In a preferred embodiment of the present invention, the forwarding of the fax traffic to the intermediate fax modem comprises:

instructing the fax users to dial a specific number, the number corresponding to the extension number of the modem;

instructing the fax users to pause after dialing the specific number and then to dial the intended recipient fax number.

In a preferred embodiment of the present invention, the fax is sent using the intended recipient fax number dialed by the user.

In a preferred embodiment of the present invention, the method is applied within the sending fax device utilizing dedicated hardware for the monitoring.

In a preferred embodiment of the present invention, applying the distribution policy is done using a central computer with respect to a plurality of fax machines or fax servers.

In a preferred embodiment of the present invention, the method is applied to enforce an overall organizations distribution policy in conjunction with enforcement over other additional electronic distribution channels. In a preferred embodiment of the present invention, the additional electronic distribution channels comprise e-mail.

According to a another aspect of the present invention, a fax traffic interception device for enforcing a distribution policy with respect to information transmitted from a sending fax machine to a recipient fax machine as fax traffic is presented. The device comprising a policy storage device for storing a predefined information distribution policy with respect to the fax traffic, a fax traffic monitor unit for monitoring the fax traffic, where the monitor unit comprising:

(i) a fax traffic de-modulator for de-modulating the fax traffic being monitored into a digital stream;

(ii) a data reconstruction unit for reconstructing from the digital stream a graphic image representing at least part of the information within the fax traffic; and (iii) an image analyzer for obtaining information regarding content of a respective fax from within the reconstructed image, and an enforcement unit associated with the monitoring unit for applying the distribution policy with respect to the analyzed fax traffic.

In a preferred embodiment of the present invention, the fax traffic interception device comprising mimic circuitry for mimicking the receiving fax machine to the sending fax machine and for mimicking the sending fax machine to the receiving fax machine, thereby to intercept and subsequently send on the fax traffic.

In a preferred embodiment of the present invention the image analyzer is configured to obtain from the reconstructed image an identification of the source of the faxed document.

In a preferred embodiment of the present invention the enforcement unit is configured to apply the pre-defined policy by adding forensic information to the document.

In a preferred embodiment of the present invention applying the policy comprises blocking the transmission to unauthorized recipients.

In a preferred embodiment of the present invention the fax traffic interception device further comprising a switch simulated using a central-office card.

In a preferred embodiment of the present invention the fax traffic interception device is configured to forward the fax traffic to the modem using a hot-line mechanism. In a preferred embodiment of the present invention, this device is configured to apply the forwarding prior to dialing, wherein the modem receives a dialing signal directly after an off-hook signal is received.

In another aspect of the present invention, a method for enforcing a distribution policy with respect to information transmitted via fax server is presented. The method comprising defining an information distribution policy with respect to the fax traffic, monitoring the fax traffic in accordance with the distribution policy, where the monitoring comprising reconstructing from the digital stream a graphic image representing at least part of the information within the fax traffic and analyzing information within the reconstructed image, and applying the distribution policy with respect to the fax traffic.

In another aspect of the present invention, a fax traffic interception device for enforcing a distribution policy with respect to information transmitted via fax server is presented. The device comprising a policy storage device for storing a predefined information distribution policy with respect to the fax traffic, a fax traffic monitor unit for monitoring the fax traffic, where the monitor unit comprising a data reconstruction unit for reconstructing from the digital stream a graphic image representing at least part of the information within the fax traffic and an image analyzer for obtaining information regarding content of a respective fax from within the reconstructed image, and an enforcement unit associated with the monitoring unit for applying the distribution policy with respect to the fax traffic.

In a preferred embodiment of the present invention, system is applied as a part of an information distribution policy enforcement system, that enforce the organizational distribution policy also with respect to e-mail and/or other electronic distribution channels.

It is the object of the present invention to provide a system for monitoring and managing the information traffic via fax, specifically but not exclusively in order to protect from confidential information leakage, in accordance with a pre-defined policy.

The present invention successfully addresses the shortcomings of the presently known configurations by providing a method and system for allow monitoring and controlling of unauthorized dissemination of fax messages that preferably comprises identifying the information content of the fax message or parts of it before allowing it to be sent, which can efficiently serve digital privacy and confidentiality enforcement.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

The present invention describes a method and system for protecting confidential information. In particular, the present invention describes a system for monitoring and control information dissemination via fax machines. The system is operable to enforce a pre-defined policy with respect to fax messages or parts thereof.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

According to a first aspect of the present invention, a method and a system for protection against information leakage via fax machines and fax servers is presented, based on contextual analysis and screening of the fax traffic. In a preferred embodiment of the present invention, the system contains a computerized component that acts as a proxy server: it stores the digital content of the fax massage, analyzes it and, according to a pre-defined policy, decides whether to forward the message to the indented recipients.

In a preferred embodiment of the present invention, the system performs optical character recognition (OCR) over the fax data, thereby allowing for analysis of the textual content. Software packages operable to perform optical character recognition are prevalent, and can be used in order to perform the OCR operation.

In a preferred embodiment of the present invention, the system allows for identification of the source document of the faxed document based on its textual content, providing that the source document was classified and was introduced as such to the system. In this case, a method similar to the one described in PCT patent application number IL02/00037 can be applied in order to identified the content of the document.

In a preferred embodiment of the present invention, the system analyzes key words and key-phrases, and decides whether to allow transmitting of the fax based on the keyword content.

Figure 1:
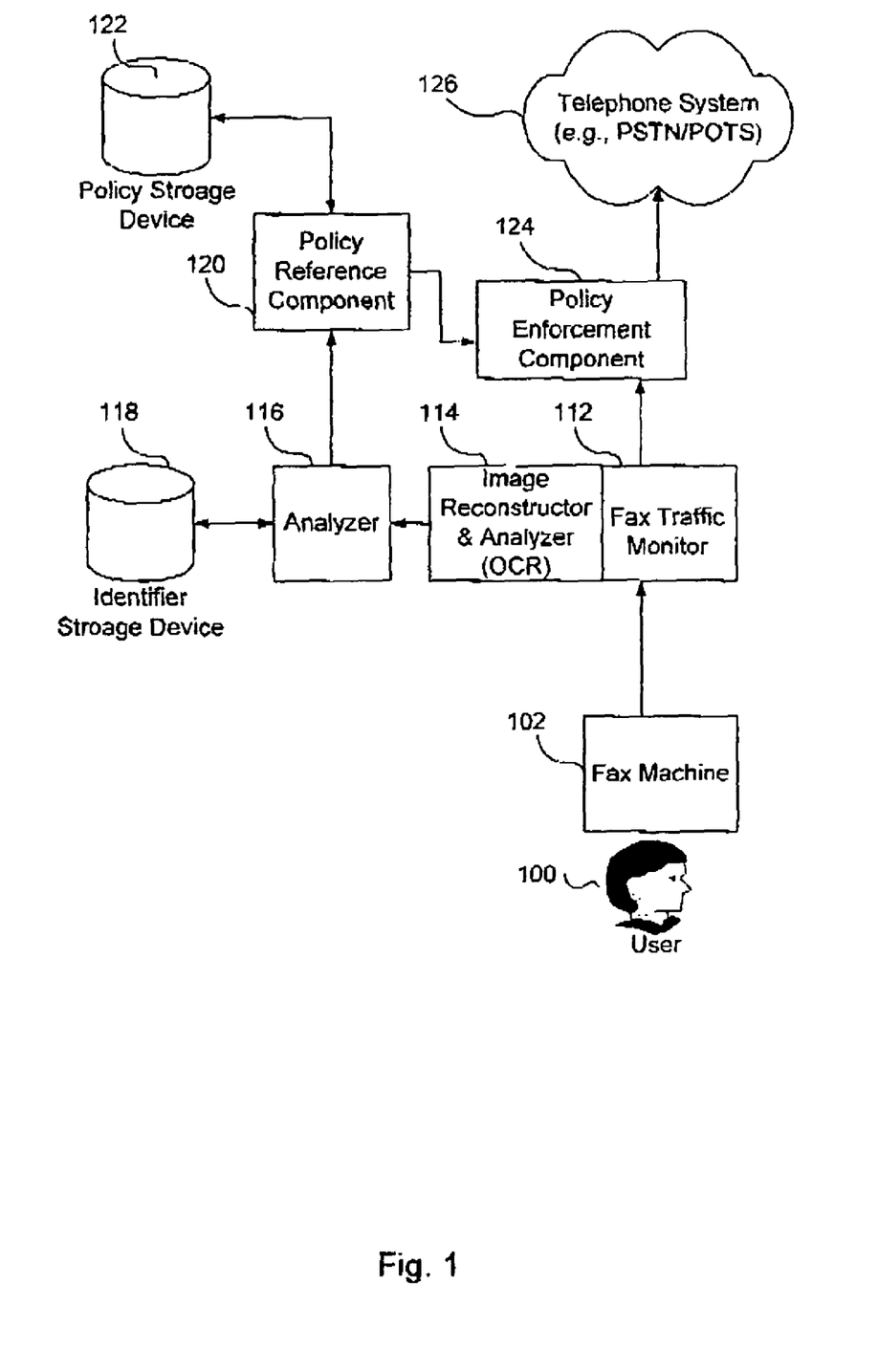
FIG. 1 illustrates a system for monitoring information dissemination via fax machines, constructed and operative according to a preferred embodiment of the present invention.

Reference is first made to FIG. 1, which illustrates a system for monitoring information dissemination via fax machines, constructed and operative according to a preferred embodiment of the present invention; the fax sender 100 uses the fax machine 102 in order to send a fax. The fax is then sent to the fax traffic monitor 112, together with the relevant details of the recipient. The fax traffic monitor 112, which preferably comprises a data reconstruction unit & image analyzer component 114, extracts the digital content of the fax and the image, transform it to a graphic image representing at least part of the information within the fax and preferably transform the graphical information into a set of characters using an Optical Character Recognition (OCR) software. The set of recognized characters is transferred, preferably as a text file, to the analyzer 116, which analyzes the content of the document in order to detect whether the content of the fax message corresponds to the contents of a confidential document, or whether the fax message contains certain key-words or key-phrase, preferably utilizing the database 118. The results of the analysis are then transferred to the policy reference component 120, which determines the required policy, preferably using the information stored in the database 122. Descriptions of the required action are then sent to the policy enforcement component 124, which perform the required actions: e.g., to allow the message to be transferred to allowed recipients (e.g., using telephone system 126, such as plain old telephone service (POTS)), or to block the transmission.

Figure 2:
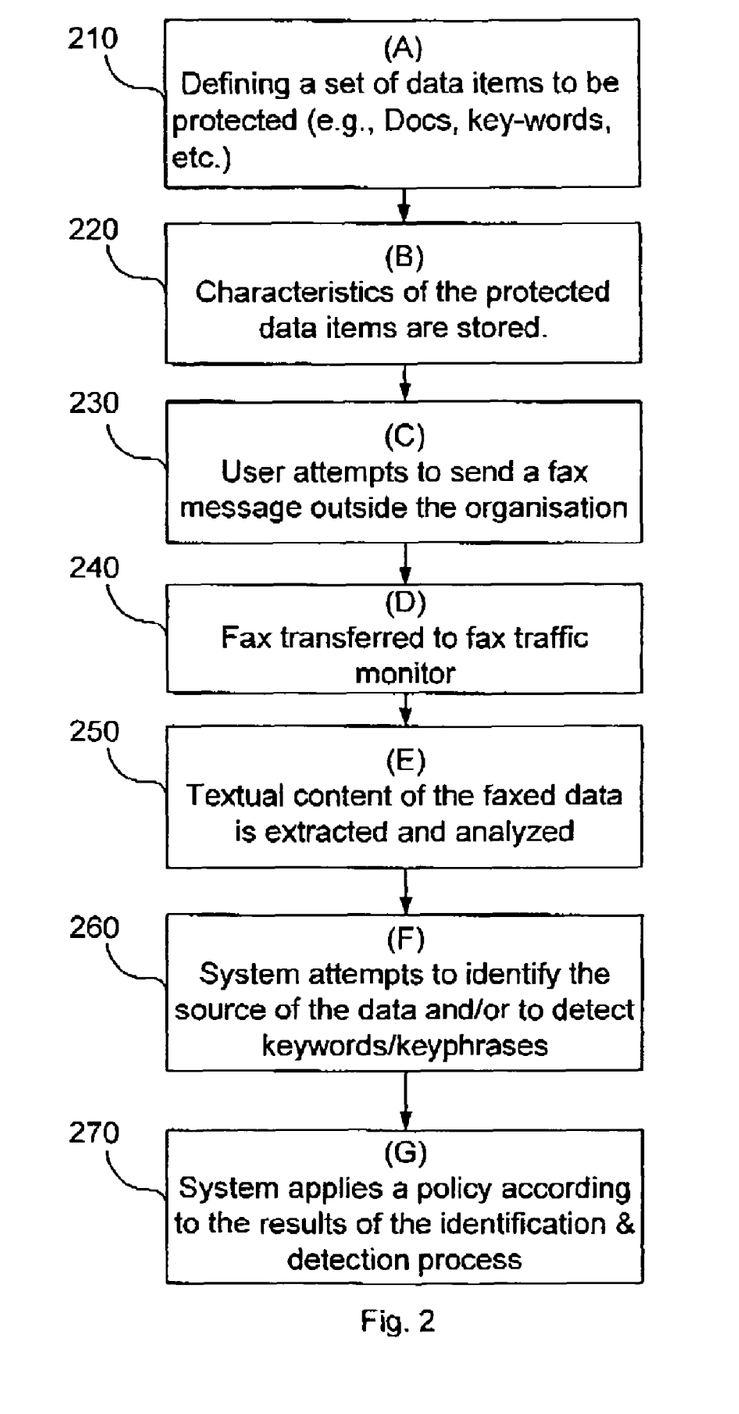
FIG. 2 is a flowchart that describes the various stages that comprises a method for monitoring and control fax traffic, operative according to a preferred embodiment of the present invention.

Turning now to FIG. 2, there is illustrated a flowchart that describes the various stages that comprises a method for monitoring and controlling fax traffic, operative according to a preferred embodiment of the present invention. As illustrated therein, the administrator and/or the security officer of the organization and/or any other authorized person within the organization first define a set of data items to be protected, such as documents, credit-card numbers, social-security numbers, certain key-words and key-phrases etc. (stage A, indicated by 210). These data items or their characteristics are then extracted and stored, e.g., in the identifier database 118 described in FIG. 1 (stage B, indicated by 220). When a user attempts to send a fax message outside the organization (stage C, indicated by 230) the fax message is first transferred to the fax traffic monitor indicated as item 112 in FIG. 1 (stage D, indicated by 240). The textual content of the message is then analyzed by the analyzer indicated as item 116 in FIG. 1, which may utilizes the database indicated as item 118 in FIG. 1 (stage E, indicated by 250), to thereby identify the source of the data and/or to detect other restricted information items, such as keywords, key-phrases, credit-card numbers etc. (stage F, as indicated by 260). The policy reference monitor, indicated as item 120 in FIG. 1, then determines the required policy according to the results of the identification & detection process, and applies it using the policy enforcement component indicated as item 124 in FIG. 1 (stage G, as indicated by 270).

In a preferred embodiment of the present invention, the policy reference determines the required actions to be managed in accordance with:

The pre-determined policy.
The classification of the document.
The classification of the user.
The authentication level of the user.

In a preferred embodiment of the present invention, for each usage the policy comprise one or more of the follows:

Enable/disable transmission.
Restricting the transmission, according to a pre-determined set of restrictions (e.g., allow the fax to be transferred only to some of the intended recipients)
Reporting about the transmission
Monitoring the transmission In a preferred embodiment of the present invention, system is applied as a part of an information distribution policy enforcement system, that enforce the organizational distribution policy also with respect to e-mail and/or other electronic distribution channels, as described, e.g., in US patent application number US2002129140, "System and method for monitoring unauthorized transport of digital content", the content of which is hereby incorporated herein by reference in their entirety.

In a preferred embodiment of the present invention, the system includes components operable to connect to modem-based (legacy) fax machines and to forward the fax messages to a central computer, where these messages are preferably analyzed. The legacy fax communications is basically analog, and based on telephone infrastructure. When a fax is sent, a telephone call is established between the two modems, then modem communication is established, and only then, the fax data is transferred, usually using RLE (run length encoding). An idle phone line is a high resistance ('open') loop on which the switch supplies 48 Volt DC voltage. When the line is ringing, the switch supplies 88 Volt 20 Hertz AC for short periods (in old phones, this voltage was directly used for ringing). When a call is established from the phone the loop closes (the resistance drops), and the voltage drops to 3-9 Volts DC, this is perceived as an off-hook signal by the switch. The switch sends a dial tone (a continuous tone), and then dialing occurs. Dialing is done in one of two ways: pulse dialing, made up from a series of very short openings of the loop (on-hooks), and DTMF (dual tone multi frequency) dialing which is made up from a series of composite tones. After the switch receives the number, it establishes a call to the receiving fax, and waits for it to go off-hook. During the waiting time, it sends a ringing tone (a slow periodic tone). If the other side is busy, the sender (commonly known as the originating) fax will receive a busy tone (a faster periodic tone). After the receiving (commonly known as terminating) fax answers, a modem handshake occurs, and the data is sent.

Figure 3:
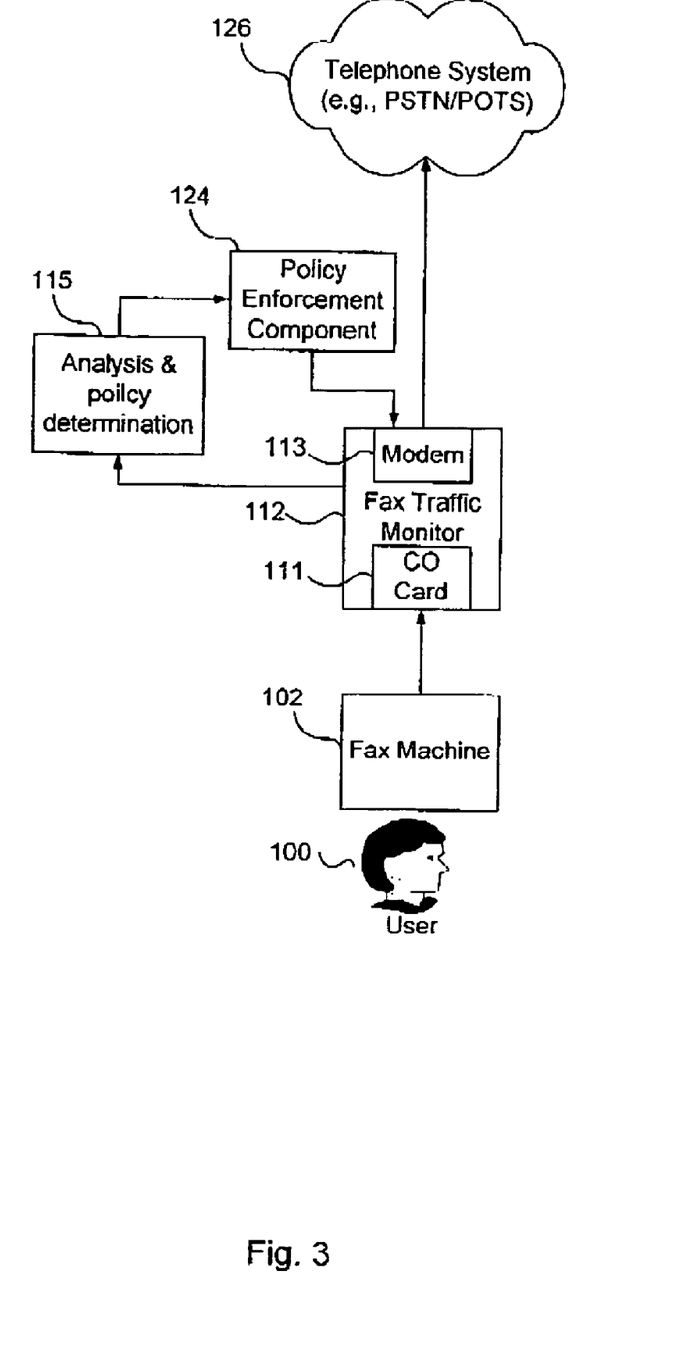
FIG. 3 illustrates a preferred embodiment of a fax traffic monitor for a modem-based (legacy) fax machine, utilizing central-office (CO) card and a modem.

Considering the legacy hardware implementation described above, in a preferred embodiment of the present invention the modem traffic is intercepted using at least one of the following methods and techniques:

Simulating a switch and a receiving fax, receiving the dialed digits and the sent fax, and then simulating a sending fax and sending the fax after it has been duly scanned. The switch can be simulated using a standard central-office (CO) card. This scheme is illustrated in FIG. 3: the fax machine 102 is connected to the fax traffic monitor 112 via the CO card 111. The fax traffic monitor 112 obtains the faxed data and sends it for analysis at the analysis & policy determination components 115, which preferably comprises a data reconstruction unit & image analyzer component 114, the analyzer 116, and the policy reference component 120 described above. According to the results of the analysis and the pre-defined policy, the policy enforcement component instructs the modem 113 whether to block the transmission or to re-send the data via the telephone system 126.

Figure 4:
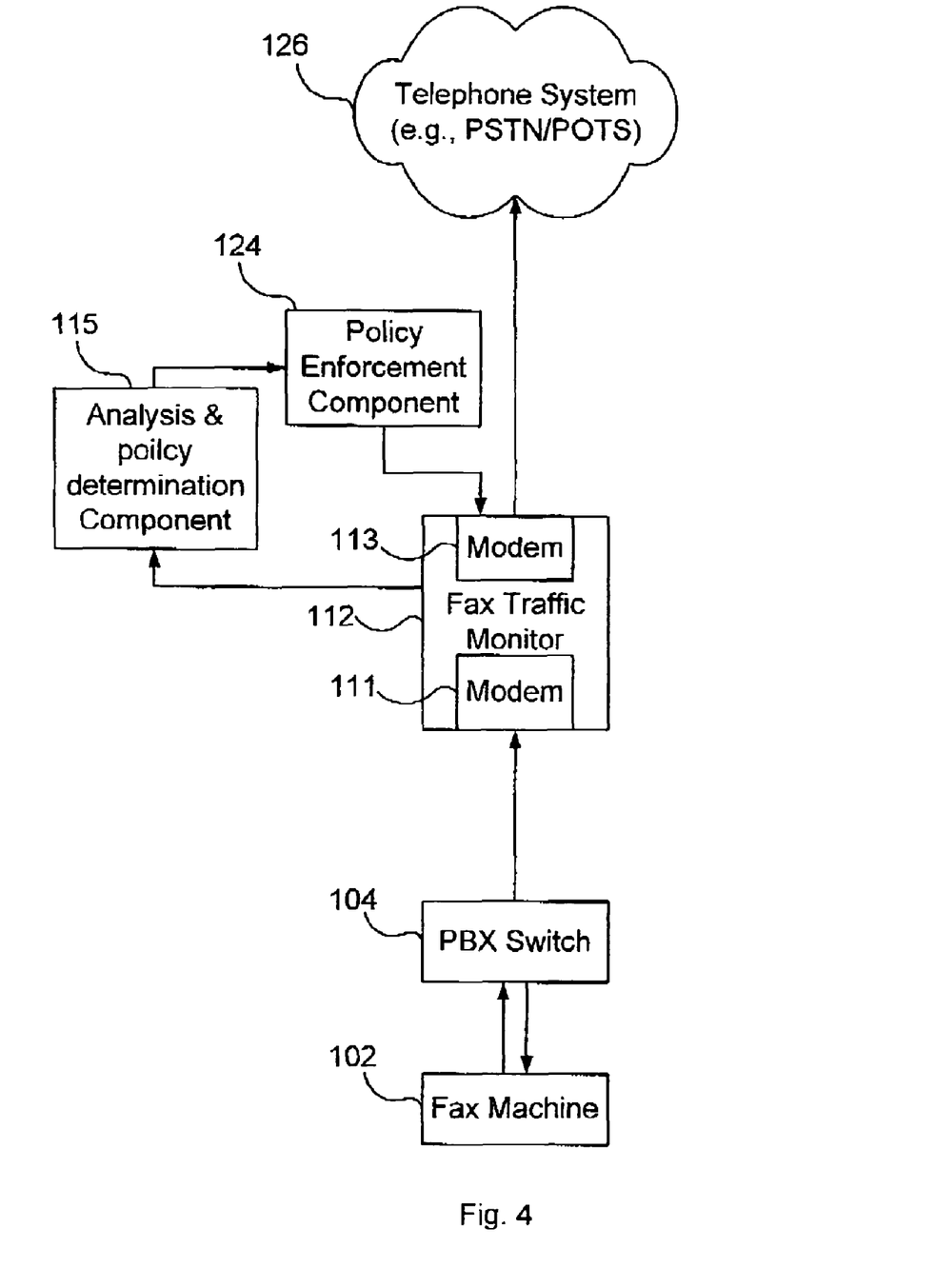
FIG. 4 illustrates a preferred embodiment for connecting the fax traffic monitor via a "hot line", utilizing PBX switches and modems.

Using a forwarding mechanism, commonly known as "hot line", preferably provided by a local PBX (Private Branch Exchange) switch or a remote switch, and automatically forwarding all fax calls to be received by a modem mechanism. The forwarding occurs before dialing occurs, and directly after an off-hook is received the modem receives the dialing, and then the fax. The fax is stored, duly scanned and then, simulating a "sending fax", is sent to the authorized recipients, according to the pre-defined policy. The sending is preferably performed using the received dialing, and e.g., using DTMF (Dual Tone Multi Frequency) emulation. FIG. 4 illustrates this method: a "hot line" for the fax machine 102 is provided by a local PBX switch 104 and all fax calls are automatically forwarded to be received by a modem 111 and stored in the fax traffic monitor 112 for analysis and policy determination by the analysis and policy determination component 115. According to the results of the analysis, the policy enforcement component 124 instructs the modem 113 whether to forward the fax call to its intended recipients via the telephone system 126.

Figure 5:
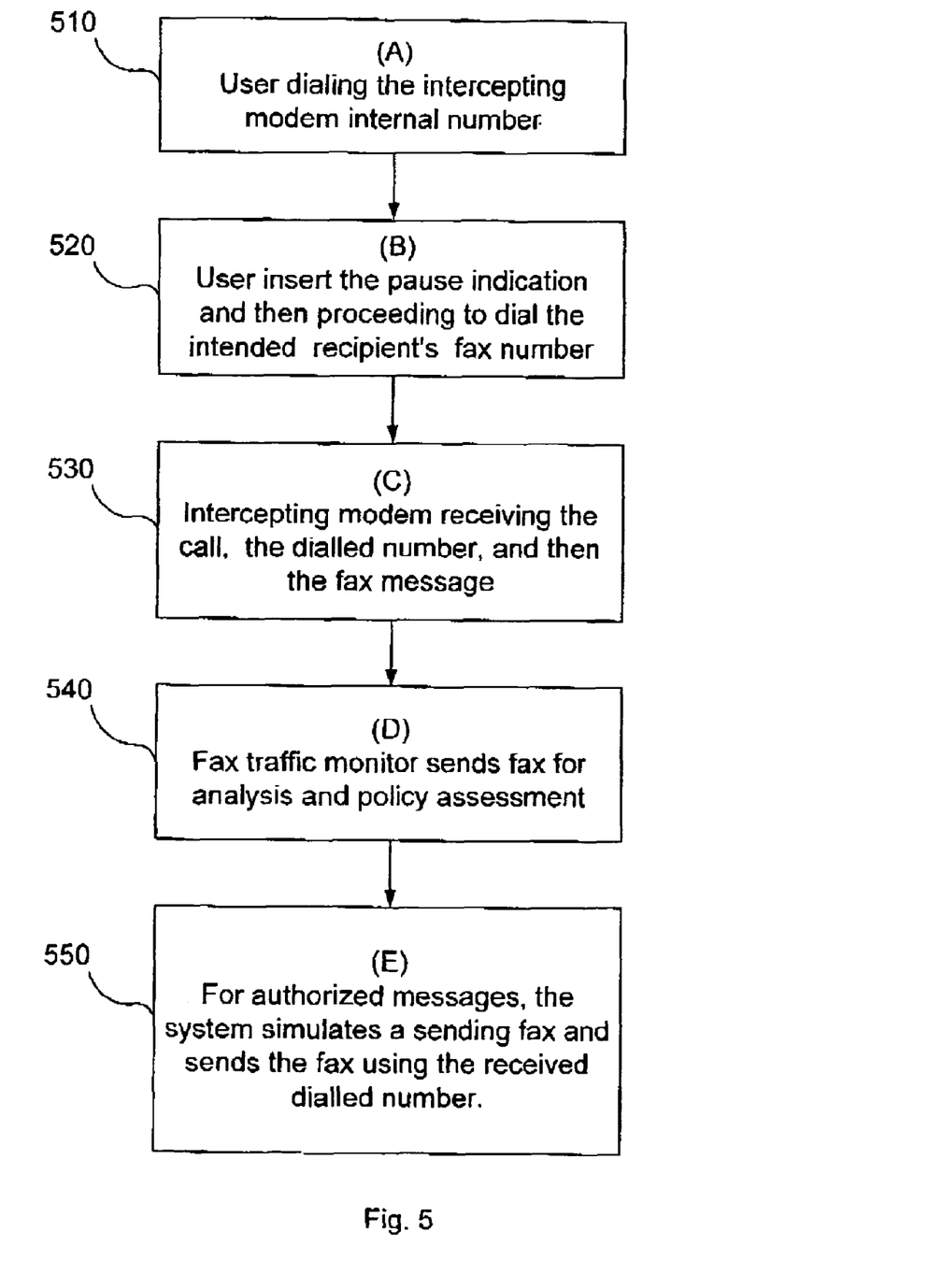
FIG. 5 is a flowchart that describes the various stages that comprises the above method for monitoring and control fax traffic, operative according to a preferred embodiment of the present invention.

Instructing the fax users to dial a specific (internal) number, then "pause" (i.e., giving it a delay indication, causing it to pause for the specified duration between dialing the two numbers. Note that most modern faxes can receive a pause as part of the dialing when the fax accumulates the manually (or otherwise) dialed digits before it actually dials to send the fax). Then, after the pause, it dials the intended number, the specific number being the number of the intercepting modem. The intercepting modem receives the call, the dialing, and then the fax. The fax is then stored, duly scanned & analyzed. If it is allowed to be sent, the system simulates a sending fax and sends the fax using the received dialed number. Turning now to FIG. 5, there is illustrated a flowchart that describes the various stages that comprises the above method for monitoring and control fax traffic, operative according to a preferred embodiment of the present invention. As illustrated therein, the user first dials the internal number of the intercepting modem. (stage A, indicated by 510). The user then inserts a pause indication and then dials the intended recipient fax number (stage B, indicated by 520). The intercepting modem receiving the call, the dialed number, and then the fax message (stage C, indicated by 530). Fax proxy sends fax for analysis and policy assessment (stage D, indicated by 540). For authorized messages, the system simulates a sending fax and sends the fax using the received dialed number. (stage E, indicated by 550)

In a preferred embodiment of the present invention, the method utilizes eavesdropping capabilities (as opposed to proxying) to intercept fax traffic. In this case, the system attempts to determine whether the transport is allowed. The system logs the details of the transport and, in cases in which unauthorized transport is detected, the system preferably attempts to block the rest of the transport.

Figure 6:
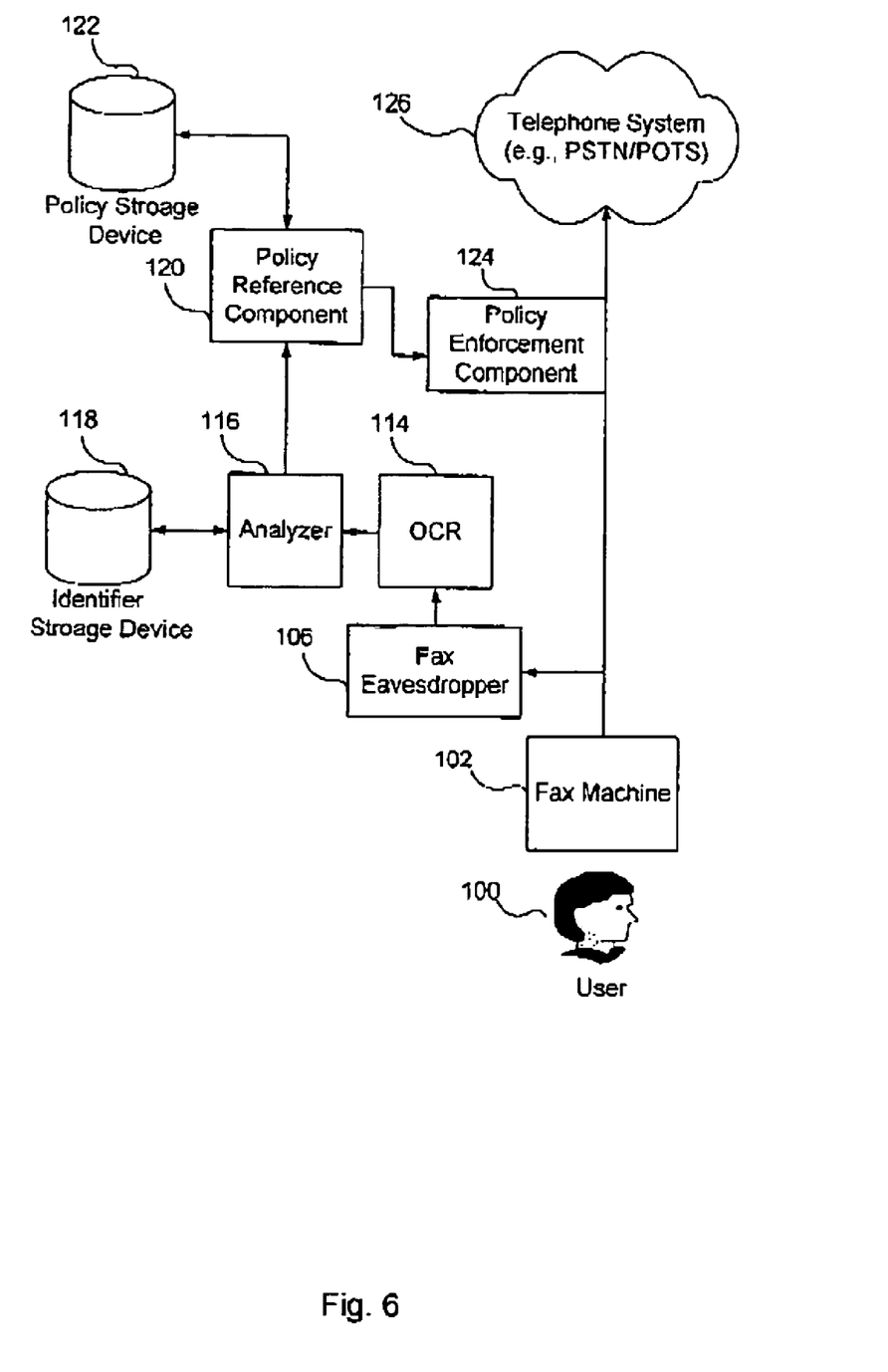
FIG. 6 illustrates a method for analyzing fax messages by eavesdropping and enforcing a policy, constructed and operative according to a preferred embodiment of the present invention.

Reference is now made to FIG. 6, which is a simplified illustration showing a conceptual illustration of a system, substantially similar to the system described in FIG. 1, constructed and operative in accordance with a further preferred embodiment of the present invention. Parts that are the same or substantially similar as in previous figures are given the same reference numerals and are not described again except to the extent necessary for an understanding of the present figure. In the embodiment of FIG. 6, the system does not utilize proxying. Instead, a fax eavesdropper 109 obtains the faxed message using a standard phone eavesdropping technique, and sends the data for further analysis. In this case, if an unauthorized transport is detected, the system is operable to block or interfere with the rest of the transmission utilizing the policy enforcement component 124, e.g., by disconnecting the line or adding to the line a disruptive noise.

In a preferred embodiment of the present invention, the system is operable to automatically put the details of the sender on the fax, either in clear text or by using a special watermark. In a preferred embodiment of the present invention, the watermark is substantially imperceptible, yet robust to fax encoding and to attempts to deliberately remove it, so that it can serve as forensic information for faxed messages and documents, in a manner that allows identifying the source of the breached documents, thereby providing an effective deterrence. This is especially important in cases where the faxed message is sent to more then one recipient. Embedding of forensic information is preferably performed by altering parts of the information object in the fax message in a manner that is preferably substantially imperceptible, as described in PCT application number IL02/00464, filed Jun. 16$^{th}$, 2002. The forensic information can be inserted in two manners: textual, which requires to transform the fax message into text (e.g., using OCR), and then embedding forensic information within the text and pictorial, where the data is embedded in the graphical representation of the fax message.

In a preferred embodiment of the present invention, the system is operable to put a marker that allows fast and effective identification and/or classification of the fax and its content (e.g. by attaching header and/or footer, which includes the required descriptors or by using a barcode)

Figure 7:
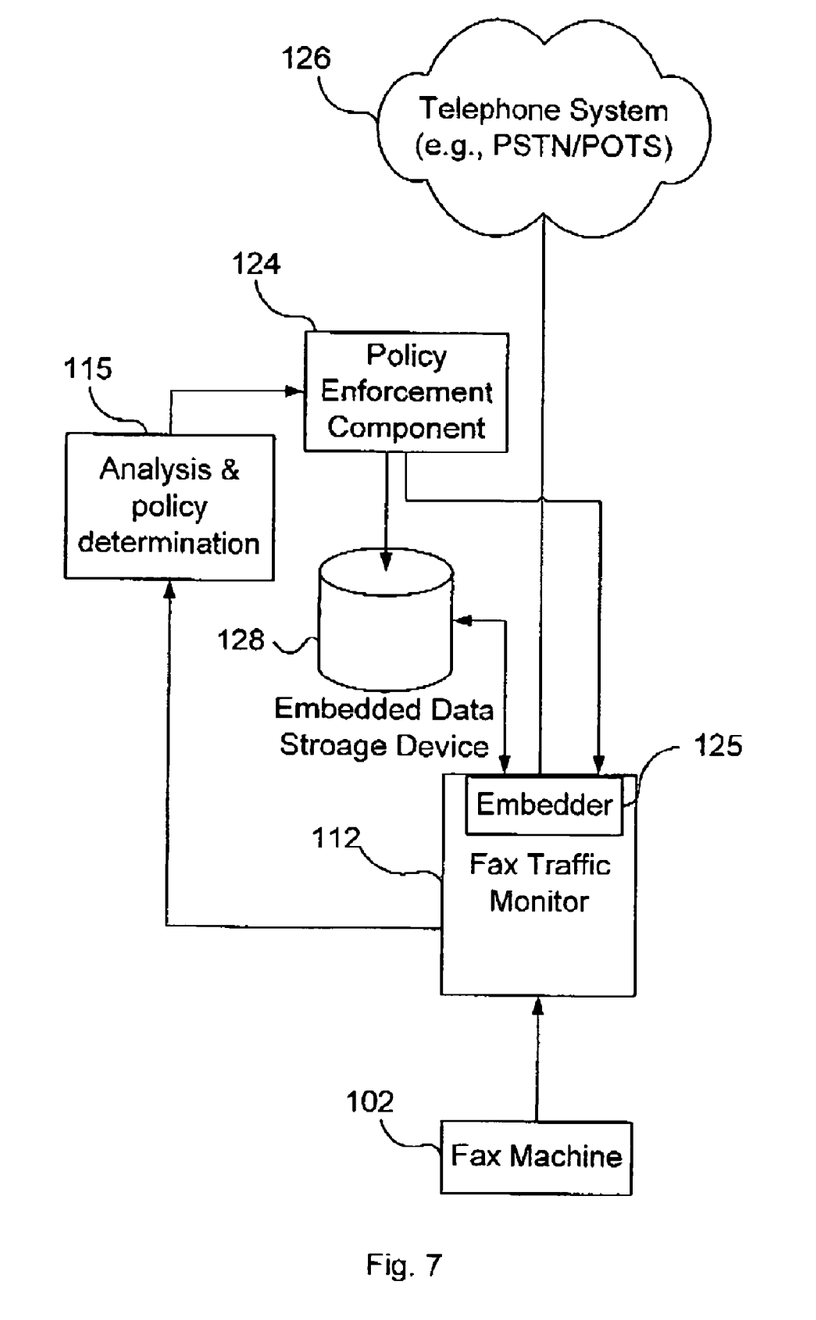
FIG. 7 describes a system for automatic embedding of identification and/or forensic information in fax messages, constructed and operative according to a preferred embodiment of the present invention, and FIG. 8 describes a system with a centralized server that allows enforcement in de-centralized organizations, constructed and operative according to a preferred embodiment of the present invention.

FIG. 7 describes a system for automatic embedding of identification and/or forensic information in fax messages, constructed and operative according to a preferred embodiment of the present invention: a fax message is sent from the fax machine 102 to the fax traffic monitor 112, the message is preferably subjected to analysis and the corresponding policy is preferably determined by the analysis and policy determination module 115. According to the determined policy, the policy enforcement component 124 instructs the embedder 125 to embed the relevant details and/or substantially imperceptible forensic data. The embedded data is registered in the embedded data database.

In a preferred embodiment of the present invention, the system utilizes methods for transforming phone-number to Domain-Name Server (DNS) addresses, in order to identify recipients and/or senders.

In a preferred embodiment of the present invention, the system is operable to block fax transmission to certain recipients, identified by their phone-number.

Figure 8:
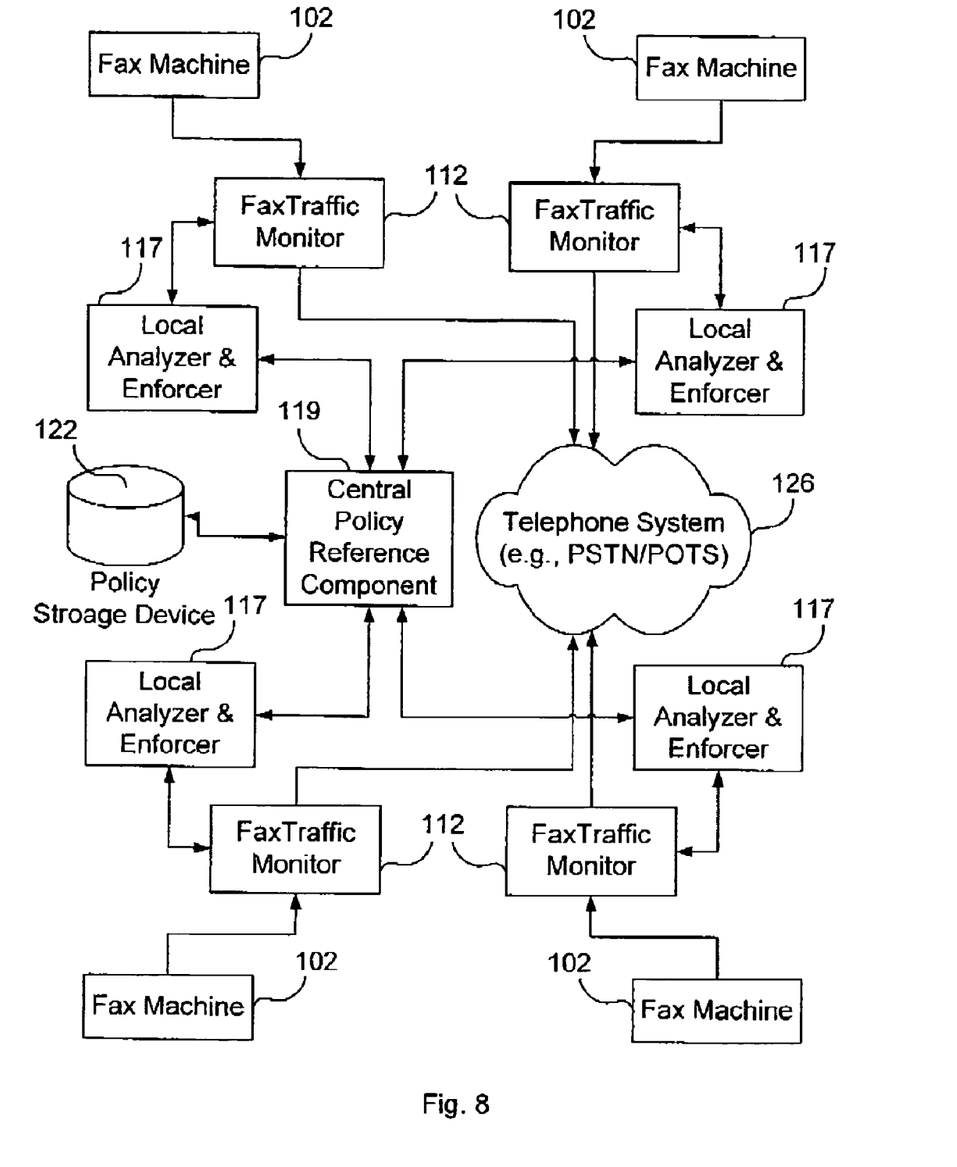

In a preferred embodiment of the present invention, the system utilizes a centralized server that allows enforcement in de-centralized organizations. In this case, the policy and preferably the identifiers of confidential documents, protected keywords etc. are stored at the central server. A local server performs the analysis and sends the descriptors to the central server. The central server attempts to identify the content and/or to identify key-words and key-phrases, in order to determines the required actions and sends instructions to the local servers which thereafter applies the required policy. FIG. 8 describes a system with a centralized server that allows enforcement in de-centralized organizations, constructed and operative according to a preferred embodiment of the present invention. The fax machines within the organization 102 are connected to the local fax traffic monitor 112, which is connected to the local analyzer & enforcer 117, which analyzes the fax message. The results of the analysis are sent to the central policy reference component 119, which determine the required policy, preferably, using the information stored in database 122. In a preferred embodiment of the present invention, the database 122 also contains identifiers of the documents, and the central policy reference component 119 is also operable to identify the faxed documents. Descriptions of the required action are then sent to the local analyzer & enforcer 117, which performs the required actions: e.g., to allow the message to be transferred to allowed recipients (e.g., using telephone system 126, such as plain old telephone service (POTS)), or to block the transmission.

In a preferred embodiment of the present invention, the analysis of the content is performed on the fax-machine itself, using specialized hardware that allows the analysis of the image scanned by the fax the machine and preferably also identification of the key-words and/or key-phrases and/or the source of the document, in order to apply the information distribution accordingly.

In a preferred embodiment of the present invention, some of the fax messages that are sent are preferably encrypted, according to a pre-determined policy, and the key is sent to the recipients in another channel.

In a preferred embodiment of the present invention, the fax is sent directly to the user voice mailbox (providing that the user voice mailbox support fax receiving) or to the user's unified messaging service, which is provided by many communication companies, thereby limiting the possibility of unauthorized attempts to access the content of the fax.

In a preferred embodiment of the present invention, the fax traffic monitor and the analyzer are based on a tamper resistant software component.

The present invention successfully addresses the shortcomings of the presently known configurations by providing a method and system for allow monitoring and controlling of unauthorized dissemination of fax messages, which can efficiently serve digital privacy and confidentiality enforcement.

It is appreciated that one or more steps of any of the methods described herein may be implemented in a different order than that shown, while not departing from the spirit and scope of the invention.

While the present invention may or may not have been described with reference to specific hardware or software, the present invention has been described in a manner sufficient to enable persons having ordinary skill in the art to readily adapt commercially available hardware and software as may be needed to reduce any of the embodiments of the present invention to practice without undue experimentation and using conventional techniques. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent, or patent application was specifically and individually indicated to be incorporated herein by reference. In addition, citation or identification of any reference in this application shall not be construed as an admission that such reference is available as prior art to the present invention.

The invention claimed is:

1. A fax traffic interception device for enforcing a distribution policy with respect to information transmitted from a sending fax machine to a recipient fax machine as fax traffic, the device comprising:
   (a) a policy storage device for storing a predefined information distribution policy with respect to said fax traffic;
   (b) a fax traffic monitor unit for monitoring the fax traffic, said monitor unit comprising:
      (i) a fax traffic de-modulator for de-modulating said fax traffic being monitored into a digital stream;
      (ii) a data reconstruction unit for reconstructing from said digital stream a graphic image representing at least part of the information within said fax traffic; and
      (iii) an image analyzer for obtaining information regarding content of a respective fax from within said reconstructed image, and
   (c) an enforcement unit associated with said monitoring unit for applying said distribution policy with respect to said analyzed fax traffic.

2. The fax traffic interception device of claim 1, comprising mimic circuitry for mimicking said receiving fax machine to said sending fax machine and for mimicking said sending fax machine to said receiving fax machine, thereby to intercept and subsequently send on said fax traffic.

3. The device of claim 1, wherein said image analyzer is configured to obtain from said reconstructed image an identification of the source of the faxed document.

4. The device of claim 1, wherein said enforcement unit is configured to apply said pre-defined policy by adding forensic information to said document.

5. The device of claim 1, wherein said applying said policy comprises blocking the transmission to unauthorized recipients.

6. The device of claim 1, further comprising a switch simulated using a central-office card.

7. The device of claim 1, configured to forward said fax traffic to said modem using a hot-line mechanism.

8. The device of claim 7, configured to apply said forwarding prior to dialing, wherein said modem receives a dialing signal directly after an off-hook signal is received.

9. A fax traffic interception device for enforcing a distribution policy with respect to information transmitted via fax server, fax traffic, the device comprising:
   (a) a policy storage device for storing a predefined information distribution policy with respect to said fax traffic;
   (b) a fax traffic monitor unit for monitoring the fax traffic, said monitor unit comprising:
      (i) a data reconstruction unit for reconstructing from said digital stream a graphic image representing at least part of the information within said fax traffic; and
      (ii) an image analyzer for obtaining information regarding content of a respective fax from within said reconstructed image, and
   (c) an enforcement unit associated with said monitoring unit for applying said distribution policy with respect to said fax traffic.

* * * * *